United States Patent
Lowery et al.

(10) Patent No.: US 7,364,809 B2
(45) Date of Patent: Apr. 29, 2008

(54) MAGNETIC RECORDING TAPE MEDIA HAVING LOW ABRASIVITY AND RELIABLE MEDIA PERFORMANCE

(75) Inventors: David C. Lowery, Roberts, WI (US); Ryosuke Isobe, Opelika, AL (US)

(73) Assignees: Imation Corp., Oakdale, MN (US); Quantegy, Inc., Opelika, AL (US)

( * ) Notice: Subject to any disclaimer, the term of this patent is extended or adjusted under 35 U.S.C. 154(b) by 256 days.

(21) Appl. No.: 10/677,120

(22) Filed: Oct. 1, 2003

(65) Prior Publication Data
US 2004/0115454 A1     Jun. 17, 2004

Related U.S. Application Data

(63) Continuation-in-part of application No. 10/263,378, filed on Oct. 1, 2002.

(60) Provisional application No. 60/415,067, filed on Oct. 1, 2002.

(51) Int. Cl.
    *G11B 5/66* (2006.01)

(52) U.S. Cl. .................................................. 428/845.2

(58) Field of Classification Search ............. 428/839.6, 428/839.2, 839.3, 842, 845, 845.2
See application file for complete search history.

(56) References Cited

U.S. PATENT DOCUMENTS

| 5,510,168 A | * | 4/1996 | Mori et al. | 428/141 |
| 6,037,051 A | * | 3/2000 | Kakuta et al. | 428/328 |

* cited by examiner

*Primary Examiner*—Holly Rickman
(74) *Attorney, Agent, or Firm*—Eric D. Levinson

(57) ABSTRACT

A magnetic recording medium including a non-magnetic substrate and a magnetic coating. The non-magnetic substrate defines a front side and a backside. The magnetic coating is formed over the front side and is characterized by an Abrasivity Index of not greater than 350 microinches. In one preferred embodiment, the magnetic coating includes a lower layer formed on the front side of the substrate, and an upper layer formed over the lower layer. In this regard, the upper layer includes a magnetic metal particle dispersed in a binder and otherwise provides the Abrasivity Index. In another embodiment, the magnetic recording medium is a DLT tape.

21 Claims, 6 Drawing Sheets

MAGNETIC RECORDING TAPE MEDIA HAVING LOW ABRASIVITY AND RELIABLE MEDIA PERFORMANCE

CROSS-REFERENCE TO RELATED APPLICATIONS

The subject matter of this application is related to the subject matter of U.S. Provisional Patent Application No. 60/415,067, filed Oct. 1, 2002, priority to which is claimed under 35 U.S.C. §119(e) and is a continuation-in-part of U.S. Application Ser. No. 10/263,378, filed Oct. 1, 2002, the teachings of all of which are incorporated herein by reference.

BACKGROUND OF THE INVENTION

The present invention relates to a magnetic recording media. More particularly, it relates to a coated magnetic recording media, such as a magnetic recording tape, including a magnetic coating exhibiting low abrasivity with reliable performance.

Magnetic recording media, such as magnetic recording tapes, enjoy wide use and popularity. Such media has evolved to provide increased recording density or capacity per unit volume, reduced average surface roughness and surface roughness variability, reduced electromagnetic amplitude degradation caused by roughness and other factors, and increased reliability, as measured by e.g., read and write error rate increases over extended periods of use.

In general terms, magnetic recording media generally comprise a magnetic coating formed onto at least one side of a non-magnetic substrate (e.g., a film for a magnetic recording tape application). With certain designs, the magnetic coating (or "front coating") is formed as a single layer. In an effort to reduce a thickness of this magnetic recording layer, a more recent approach is to form the front coating as a dual layer construction, including a support layer (or "lower layer") on the substrate and a reduced-thickness magnetic layer (or "upper layer") formed directly on the support or lower layer. With this construction, the lower layer is typically non-magnetic or substantially non-magnetic, generally comprised of a non-magnetic powder and a binder. Conversely, the upper layer comprises a magnetic metal particle powder or pigment dispersed in a polymeric binder. Finally, with magnetic recording tape, a backside coating is applied to the other side of the non-magnetic substrate in order to improve the durability, conductivity, and tracking characteristics of the media.

Linear Tape Open (LTO) technology seeks to provide open-format, high-performance tape storage products that enhance reliability and versatility in, for example, the network tape storage environment. LTO technology, being open-format, provides users with multiple sources of product and media, and enables compatibility between the offerings of different venders. The ULTRIUM format is a high-capacity implementation of LTO technology. Other technologies are well-established and known in the art, for example, the Digital Linear Tape Series formats including DLT4000, DLT7000, and DLT8000 (also known as DLT4, DLT7, and DLT8) drives and media. Detail technical descriptions of each of these format generations are available from, for example, the European Computer Manufacturers Association (ECMA) and the American National Standards Institute (ANSI). DLT magnetic tape cartridges and drives are available in many systems and provide tape back-up capabilities, for example.

Regardless of the exact formatting requirements, the magnetic coating includes an abrasive additive. Media abrasivity is controlled by the selection of the type and amount of abrasive additive, as well as the processing conditions. Processing conditions include compounding the dispersion, coating and drying the dispersion, calendering the resultant magnetic recording medium and burnishing the same. The purpose of adding the abrasive material to the dispersion is that the abrasive material is needed to keep read/write heads clean. However, the abrasive material also leads to degradation of the read/write head over time. Thus, a balance exists between the desired head cleaning characteristics of the abrasive and the undesired head degradation that the abrasive causes.

Regardless of format, data reliability is a function of "spacing" signal amplitude between the read/write head and the magnetic recording medium during use (i.e., degradation of playback signal strength). This spacing loss can be the result of excessive abrasivity, wherein the active elements of the read/write head are eroded away from the average media plane of travel. In effect, the point at which the magnetic recording media's abrasivity causes read/write head erosion defines an upper abrasivity limit. Conversely, spacing loss can be due to insufficient abrasivity, which allows the build-up of debris on and around the active elements of the read/write head, forcing the media plane of travel away from the active elements. The point at which the magnetic recording media's abrasivity allows for the accumulation of excessive debris effectively defines the lower abrasivity limit of the particular media/format. Notably, the evolution of magnetic recording media technology has required an increase in the available recording density. For example, the DLT4 format operates at a recording density of 55 kfci. This and other high-recording density formats are less tolerant to spacing loss (as dictated by the Wallace equation). Thus, as recording density increases for DLT and other high-recording density formats, the upper and lower recording medium abrasivity limits are typically forced to converge, reducing the functional margin between these limits.

In light of the above, when developing the magnetic coating for a magnetic recording medium, manufacturers typically start with a formulation/processing technique that generates a high abrasivity level (i.e., above the expected upper abrasivity level). Through various testing, the formulation and/or processing technique(s) is altered so as to lower the abrasivity level to a point whereby potential erosion of the read/write head during use is within acceptable limits. In other words, the magnetic coating is modified so as to approximate the upper abrasivity limit. At this point, it is assumed that because the abrasivity level is well above the theoretical lower abrasivity limit, performance reliability (due to insufficient abrasivity) is not at issue. However, read/write head wear issues may still arise. That is to say, even at or near the upper abrasivity limit, the so-formed magnetic recording medium may cause undesirable read/write head erosion during use. Thus, a need exists for magnetic recording media having a magnetic coating abrasivity that more closely approximates the theoretical lower abrasivity limit while exhibiting performance reliability comparable to other, similarly-formatted products.

SUMMARY OF THE INVENTION

One aspect of the present invention relates to a magnetic recording medium including a non-magnetic substrate and a magnetic coating. The non-magnetic substrate defines a front side and a backside. The magnetic coating is formed over the front side and is characterized by an Abrasivity Index of not greater than 350 microinches, alternatively in the range of 150-350 microinches. In one preferred embodiment, the magnetic coating includes a lower layer formed on the front side of the substrate, and an upper layer formed over the lower layer. In this regard, the upper layer includes a magnetic metal particle dispersed in a binder and otherwise provides the Abrasivity Index. In another embodiment, the magnetic recording medium is a DLT tape, such as DLT4, DLT5, or DLT6.

DETAILED DESCRIPTION OF THE PREFERRED EMBODIMENTS

Figure 1:
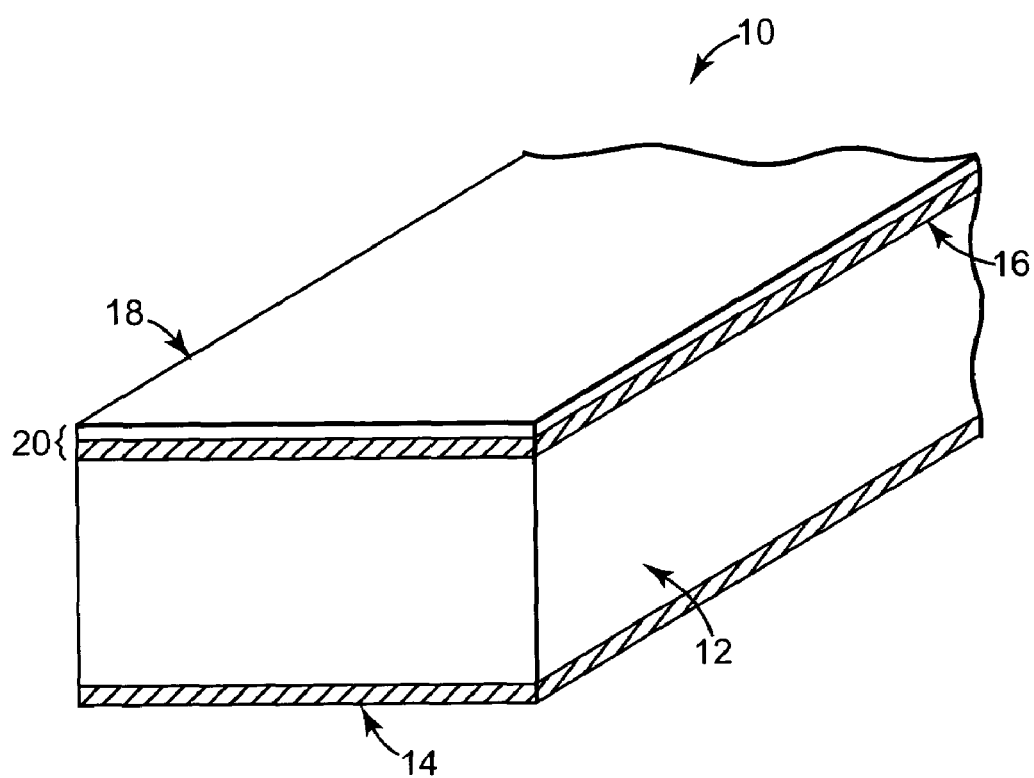
FIG. 1 is a cross-sectional view of a magnetic recording media in accordance with the present invention.

One exemplary embodiment of a magnetic recording medium 10 in accordance with the present invention is provided in FIG. 1. In a preferred embodiment, the magnetic recording medium 10 is a magnetic recording tape adapted to satisfy ECMA DLT4 standards. Alternatively, however, the present invention includes other types of magnetic recording medium formats such as other DLT formats, LTO format, magnetic disks, etc. With this in mind, the magnetic recording medium 10 includes a non-magnetic substrate 12, a backcoat 14, and a magnetic front coating 16. With the one embodiment of FIG. 1, the magnetic front coating 16 includes a lower support layer 18 and a magnetic upper layer 20. The various components are described in greater detail below. In general terms, however, the magnetic front coating 16, and in particular the magnetic upper layer 20 with the one exemplary embodiment of FIG. 1, is characterized by an Abrasivity Index of not greater than 350 microinches, more preferably in the range of 150-350 microinches, and even more preferably not greater than 300 microinches, preferably in conjunction with a DLT-compatible format.

Substrate

The substrate 12 can be any conventional, non-magnetic substrate useful as a magnetic recording medium support. Exemplary substrate materials useful for magnetic recording tapes include polyesters, such as polyethylene terephthalate, polyethylene naphthalate, a mixture of polyethylene terephthalate and polyethylene naphthalate; polyolefins (e.g., polypropylene); cellulose derivatives; polyamides; and polyimides. Preferably, polyethylene terephthalate (PET) is employed.

Backcoat

The backcoat 14 is generally of a type conventionally employed, and thus primarily consists of a soft (i.e., Moh's hardness of less than 5) non-magnetic particle material, such as carbon black or silicon dioxide particles. In one preferred embodiment, the backcoat layer 14 comprises a combination of two kinds of carbon blacks, including a primary, small carbon black component and a secondary, large texture carbon black component, in combination with appropriate binder resins. The primary, small carbon component has an average particle size on the order 10-25 nm, whereas the secondary, large carbon component preferably has an average particle size on the order of 50-300 nm.

As is known in the art, backcoat pigments dispersed as inks with appropriate binders, surfactant, ancillary particles, and solvents, are typically purchased from a designated supplier. In a preferred embodiment, the backcoat 14 binder includes at least one of a polyurethane, phenoxy resin, and nitrocellulose added in an amount appropriate to modify coating stiffness as desired.

Magnetic Front Coating

In a preferred embodiment, and as previously described, the magnetic front coating 16 is preferably a dual layer configuration, and includes the lower support layer 18 and the upper layer 20. With this in mind, the lower support layer 18 includes, in one embodiment, a primary powder material coated with an electroconductive material and a conductive carbon black material dispersed in a binder system, whereas the upper layer 20 includes a magnetic metal particle powder or pigment dispersed in a binder. As used throughout the specification, the terms "pigment" and "powder" are used interchangeably.

Lower Layer

The lower layer 18 is preferably essentially non-magnetic and includes a non-magnetic or soft magnetic (having a coercivity of less than 300 Oe) powder and a resin binder. By preferably forming the lower layer 18 to be essentially non-magnetic, the electromagnetic characteristics of the upper magnetic layer are not adversely affected. However, if it does not give any adverse effect, the lower layer 18 may contain a small amount of a magnetic powder. In general, and as described in greater detail below, the lower layer 18 preferably further includes an abrasive (or head cleaning agent) as part of the pigment and lubricants.

In one embodiment, the pigment or powder incorporated in the lower layer 18 includes a primary pigment material and conductive carbon black. The primary pigment material can consist of particles having a coercivity of less than 300 Oe coated with an electroconductive material. In one embodiment, the primary lower layer pigment material is a carbon-coated hematite material (α-iron oxide). Alternatively, other conventional non-magnetic particles such as titanium dioxide, titanium monoxide, alumina, tin oxide, titanium carbide, silicon carbide, silicon dioxide, silicon nitride, boron nitride, etc., can be provided in a form coated with carbon, tin, or other electroconductive material and employed as the primary lower layer pigment. Further, the non-magnetic particles in the lower layer pigment need not be coated with an electroconductive material or any other coating. The average particle size of the primary lower layer pigment represents a compromise between two competing considerations. If the average particle size is too large, the surface smoothness of the lower layer 18 deteriorates, and a surface roughness of the upper layer 20 is unacceptable. Conversely, when the average particle size is too small, the dispersibility or dispersion stability of the primary pigment decreases, and the surface smoothness of the lower layer 18 deteriorates.

The conductive carbon black material is preferably of a conventional type available from known commercial sources. In one embodiment, the conductive carbon black material has an average particle size of less than 20 nm, more preferably about 15 nm.

In one embodiment, the conductive carbon black is added in amounts of 1 to 5 parts by weight, more preferably 1.5 to 3.5 parts by weight, based on 100 parts by weight of the primary lower layer powder. The total amount of conductive carbon black and electroconductive coating material in the lower layer is preferably sufficient to provide a resistivity at or below $1\times10^8$ ohm/cm$^2$. Alternatively, other weight ratios can be employed and again, other material(s) useful as the lower layer 18 pigment can be employed. The lower layer 18 can optionally include additional pigment components such as an abrasive or head-cleaning agent (HCA). One preferred HCA component is aluminum oxide. Further, other abrasive particles such as silica, $ZrO_2$, $Cr_2O_3$, etc., are also acceptable.

The binder system or resin associated with the lower layer 18 preferably incorporates conventional binder resins, such as a thermoplastic resin, in conjunction with other resin components such as binders and surfactants used to disperse the HCA, a surfactant (or wetting agent), and one or more hardeners. In one embodiment, the binder system of the lower layer 18 includes a combination of a primary polyurethane resin and a vinyl chloride resin. Examples of polyurethanes include polyester-polyurethane, polycarbonate-polyurethane, polyester-polycarbonate-polyurethane, and polycaprolactone-polyurethane. Other acceptable monochloride resins such as vinyl chloride-vinyl acetate copolymers, vinyl chloride-vinyl acetate-vinyl alcohol copolymers, and vinyl chloride-vinyl acetate-maleic anhydrodide can also be employed with the primary polyurethane binder. Further, resins such as bis-phenyl-A-epoxy, styrene-acyrlonitrile, and nitrocellulose may also be acceptable.

In one embodiment, the primary polyurethane binder is incorporated into the lower layer 18 in an amount of 4 to 10 parts by weight, and preferably 6 to 8 parts by weight, based on 100 parts by weight of the electroconductive primary lower layer pigment. In a one embodiment, the vinyl chloride binder is incorporated into the lower layer 18 in an amount of 7 to 15 parts by weight, and preferably 10 to 12 parts by weight, based on 100 parts by weight of the primary lower layer pigment. Alternatively, other weight ratios can be employed.

The binder system further preferably includes an HCA binder used to disperse the selected HCA material, such as a polyurethane paste binder (in conjunction with a pre-dispersed or paste HCA). Alternatively, other HCA binders compatible with the selected HCA format (e.g., powder HCA) are acceptable.

The binder system further preferably includes a conventional surfactant or wetting agent. Known surfactants, such as phenylphosphonic acid (PPA), 4-nitrobenzoic acid, and various other adducts of sulfuric, sulfonic, phosphoric, phosphonic, and carboxylic acids are acceptable.

The binder system further preferably contains a hardening agent such as isocyanate or polyisocyanate. In one embodiment, the hardener component is incorporated into the lower layer in an amount of 2 to 5 parts by weight, and preferably 3 to 4 parts by weight, based on 100 parts by weight of the primary lower layer pigment. Alternatively, other weight ratios can be employed.

The lower layer 18 can further contain one or more lubricant such as a fatty acid and/or a fatty ester. The incorporated lubricant(s) exist throughout the front coating 16 and at the surface of the upper layer 20. The lubricant(s) reduces friction to maintain smooth contact with low drag and protects the media 10 from wear. Thus, the lubricant(s) provided in both the upper and lower layers 18, 20, are preferably selected and formulated in combination. In one embodiment, the lower layer 18 incorporates stearic acid that is at least 90% pure as a fatty acid. Alternatively, other acceptable fatty acids include myristic acid, palmitic acid, oleic acid, etc., and their mixtures. The lower layer 18 formulation can further optionally include a fatty acid ester such as butyl stearate, isopropyl stearate, butyl oleate, butyl palmitate, butylmyristate, hexadecyl stearate, oleyl oleate, etc., and their mixtures. The fatty acids and fatty acid esters may be employed singly or in combination, and are not limited to at least 90% purity grades.

As described in greater detail below, the lower layer 18 is coated to the substrate 12 so that the lower layer 18 is initially prepared as a coating material that includes the above-described components and a solvent. With this in mind, the solvent associated with the lower layer coating material preferably includes 5-50% cyclohexanone (CHO), 30-90% methyl ethyl ketone (MEK), and 5-90% toluene (Tol), more preferably 5-40% CHO, 30-70% MEK, and 10-60% Tol. Alternatively, other ratios can be employed. Even further, other acceptable solvents or solvent combinations include, for example xylene, tetrahydrofuran, and methyl amyl ketone, are acceptable.

Upper Layer

As previously described, the upper layer 20 generally consists of a magnetic metal particle pigment or powder dispersed in an appropriate binder or resin system, and can further contain other components such as a lubricant. Regardless, the upper layer 20 is configured to provide, following appropriate processing, an Abrasivity Index in the range of not greater than 350 microniches, as described below.

The magnetic metal particle pigment in one embodiment consists of a primary magnetic metal particle pigment in conjunction with a large, soft particle powder (i.e., having a Moh's hardness of less than 5 and an average particle size of 5-100 nm, for example large particle carbon black), along with other additives such as an abrasive (HCA). Alternatively, the large, soft particle powder component can be eliminated.

In one embodiment, the upper layer 20 is comprised predominantly of particles composed of at least 80% elemental iron, the composite particles having a coercivity of at least 1600 Oe, alternatively between 1600-2500 Oe, alternatively of at least 1900 Oe, as measured by Vibrating Sample Magnetometer ("VSM") at 13 kOe. Optionally, the primary magnetic metal particle pigment is preferably a ferromagnetic powder, including for example, magnetic iron oxide (g-$FeO_x$) and Co-containing (coated or modified) g-$FeO_x$ (x=1.33-1.50), ferromagnetic powder α-Fe, alloys of iron with Co or Mi, etc. In order to improve performance characteristics, the preferred ferromagnetic powder optionally contains various additives, such as semi-metal or non-metal elements and their salts or oxides, such as Al, Co, Y, Ca, Mg, Mn, Na, etc. The selected ferromagnetic powder may be treated with various auxiliary agents before it is dispersed in the binder system, resulting in the primary magnetic metal particle pigment.

The upper layer pigment further includes an abrasive or head cleaning agent (HCA) component. One preferred HCA component is aluminum oxide. Alternatively, other abrasive particles such as silica, $ZrO_2$, $Cr_2O_3$, etc., can be employed. Regardless, the type and amount of the HCA in the upper layer 20 pigment is selected, optionally in combination with processing parameters, such that the resultant media 10 is characterized by an Abrasivity Index not greater than 350 microinches for a media adapted to satisfy published DLT media specifications. With this one specific end application, for example, the HCA component is incorporated into the upper layer 20 in amounts of 4-12 parts by weight, more preferably 5.75-10.35 parts by weight even more preferably approximately 9.2 parts by weight, based on 100 parts by weight of the primary upper layer powder. Of course, for other end applications, differing amounts of HCA can be employed.

The binder system associated with the upper layer 20 can be similar to the binder resin previously described with respect to the lower layer 18, including the HCA binder, the surfactant, and the isocyanate hardener. In one embodiment, the binder system of the upper layer 20 includes a primary polyurethane binder and a vinyl chloride binder. The primary polyurethane binder is contained in an amount of 3 to 20 parts by weight, preferably 4 to 12 parts by weight, based on 100 parts by weight of the primary magnetic metal particle powder. Further, the preferred vinyl chloride binder is contained in an amount of 5 to 20 parts by weight, preferably 8 to 15 parts by weight based upon 100 parts by weight of the primary magnetic metal particle powder. Where the binder system further includes an HCA binder, a surfactant and isocyanate hardener, one preferred weight ratio of the resin to the primary metal particle powder is preferably from 4:1 to 5:1.

The upper layer 20 preferably further includes a lubricant such as a fatty acid and/or fatty acid ester. With reference to the discussion above relating to the lower layer 18 lubricants, the fatty acid lubricant component of the upper layer is, in one embodiment, of a high purity (at least 90% pure). In one embodiment, the lubricant employed with the upper layer 20 includes at least 90% pure stearic acid as the fatty acid. Alternatively, other known lubricants can be employed that may or may not be high purity.

In one embodiment, the high purity stearic acid is present in an amount from 0.2 to 5.0 parts by weight, based upon 100 parts by weight of the primary magnetic metal particle powder; and a fatty acid ester component is preferably present in an amount of 0.5 to 2 parts by weight, more preferably 0.5 to 1.5 parts by weight, per 100 parts by weight of the primary magnetic metal particle powder.

Finally, as with the lower layer 18, the upper layer 20 is preferably formulated as a coating material via a solvent, with this coating material being coated onto the upper layer 18. With this in mind, in one preferred embodiment, a solvent consisting of 5-50% CHO, 30-90% MEK, and 5-40% Tol, more preferably 5-40% CHO, 40-60% MEK, and 5-40% Tol, it being understood that a wide variety of other solvents or combination solvents are available.

Processing

In general terms, the method for producing the magnetic recording medium 10 includes preparing an upper layer coating material, a lower layer coating material, and a backcoat coating material. The coatings are then formed on the substrate 12, with the backcoat coating material being applied to a backside of the substrate 12, the lower layer coating material being applied to a front side of the substrate 12, and the upper layer coating material being applied onto the coated lower layer coating material. Once dried, the lower layer 18 and the upper layer 20 are formed, and define the magnetic front coating 16. In one embodiment, the lower layer coating material and the upper layer coating material are applied pursuant to a wet-on-wet process in which the magnetic upper layer coating material is applied onto the lower layer coating material while the lower layer coating material is still wet. Preferably, a die coating technique and/or coaters is employed to conduct the wet-on-wet processing. Alternatively, other known coating techniques, such as slide or slot coating, gravure coating, etc., can be employed.

The coating materials of the upper layer, lower layer, and backcoat according to the present invention are prepared by dispersing the corresponding powders or pigments and the binders in a solvent. For example, with respect to the coating material one embodiment of for the upper layer 20, the primary metal particle powder or pigment and the large particle carbon materials are placed in a high solids mixing device along with certain of the resins (e.g., polyurethane binder, vinyl chloride binder, and surfactant) and the solvent and processed for 1-4 hours. The resulting material is processed in a high-speed impellor dissolver for approximately 30-90 minutes, along with additional amounts of the solvent. Following this let down processing, the resulting composition is subjected to a sand milling or polishing operation. Subsequently, the HCA and related binder components (where necessary) are added, and the composition left standing for approximately 30-90 minutes. Following this let down procedure, the composition is processed through a filtering operation, and then stored in a mixing tank after which time the hardener component and lubricants are added. The resulting upper layer coating material is then ready for coating.

Preparation of the lower layer coating material preferably entails a similar process, including high solids mixing of the primary lower layer pigment, the conductive carbon black material, and the binder resins in a solvent for approximately 2-4 hours. Similar sandmilling and hardener and/or lubricant additions occur as described above with respect to the upper layer 20 coating material.

Finally, a preparation of the backcoat coating material preferably entails mixing the various components, including a solvent, in a planetary mixer or similar device, and then subjecting the dispersion to a sandmilling operation. Subsequently, the material is processed through a filtration operation in which the material is passed through a number of filters. Hardener and/or lubricant(s) are also added prior to coating of the dispersion.

Following preparation, the various coating materials are then applied to the substrate 12 with the backcoat being first applied and dried. Once again, the preferred coating technique entails a die coating technique and/or coaters that applies the lower layer coating material and then the upper layer coating material prior to drying of the lower layer coating material. The magnetic particles of the upper layer are then oriented in the longitudinal direction by a magnetic orientation device and the upper and lower layers dried. Subsequently, the resultant web is wound and calendered. In one embodiment, the calendered roll is then cut in a slitting process to realize a number of narrow magnetically coated tape strands cut to the desired width. In addition, the media is burnished following or in conjunction with slitting.

Burnishing is performed in a manner to produce the desired Abrasivity Index of not greater than 350 microinches, alternatively in the range of 150-350 microinches, alternatively not greater than 300 microinches, and thus depending upon formulation of the upper layer 20, can be in accordance with known techniques. To this end, burnishing can be accomplished by scraping, vaming, lapping, or a combination of different burnishing techniques. Scraping techniques typically involve feeding the medium 10 past a scraping mechanism to smooth or alter the surface of the medium 10. Vaming techniques utilize a rotating cylinder that rotates in a direction opposite the direction of the incoming medium. The rotating cylinder, for example, is typically coated with industrial grade diamonds to smooth or alter the surface of the medium as it passes by and contacts the rotating cylinder. Lapping techniques are more complicated, but are generally more effective in burnishing the surface of the medium 10. Lapping techniques utilize a lapping film that is fed in a direction opposite the direction of the incoming medium 10. For example, the lapping film may pass in one direction over a supporting structure referred to as a lapping shoe. The medium is passed over the lapping shoe in the opposite direction. The lapping shoe forces the lapping film into contact with the surface of the medium as the medium and the lapping film feed past one another in opposite directions. In this manner, the lapping film can be used to effectively burnish the surface of the medium. Suitable lapping films, for example, include silicon carbide films, aluminum oxide films, diamond films, or the like. If multiple lapping units are used to lap the same strands of tape, various different lapping films or films having different grit sizes could be used in the different lapping units. Suitable lapping films such as silicon carbide films having grit sizes of 0.5 microns, 1.0 microns, and 3.0 microns are commercially available from 3M Abrasive Systems Division of Minnesota Mining and Manufacturing Co., of Saint Paul, Minn., or USF Surface Preparation, of Maple Grove, Minn. Optional lapping techniques are described in U.S. Patent Application Publication No. 2003/0064667, published Apr. 3, 2003, the teachings of which are incorporated herein by reference.

It will be understood that the above description relating to media layer formulations and processing techniques can vary and remain within the scope of the present invention. In particular, the present invention is premised upon forming magnetic recording media having low abrasivity that produces media reliability performance that is equivalent to competitive magnetic storage tape. To this end, the desired Abrasivity Index is achieved by a combination of the type and amount of abrasive material (e.g., HCA) in the upper layer 20 and the post-coating burnish conditions applied to the medium 10 during assembly. In one embodiment, the medium in accordance with the present invention satisfies the above Abrasivity Index parameters and has a coercivity of at least 1600 Oe, alternatively in the range of 1600-2500 Oe, alternatively at least 1900 Oe. Alternatively, and/or in addition, the medium is adapted to satisfy ECMA DLT standards.

The following examples and comparative examples further describe the magnetic recording media of the present invention, methods of forming the magnetic recording media, and the tests performed to determine the various characteristics of the resultant magnetic recording media. The examples are provided for exemplary purposes to facilitate and understand the invention, and should not be construed to limit the invention to the examples.

EXAMPLES

Test Methods

Abrasivity Index—an abrasivity test method was developed using a ferrite bar. In particular, a polycrystalline ferrite (single phase) bar comprised of 67% $Fe_2O_3$, 22% ZnO, and 11% NiO, having a grain-size of 7-8 micrometers and a density of at least 5.32 g/cm$^3$ was provided, the bar being square in transverse cross-section within 0.05 mm. A length of the magnetic recording medium (e.g., 1,700 feet) is loaded onto an appropriate tape handling machine, such as made by RecordTech, Inc., of San Jose, Calif. or an Otari ½ inch custom tape loader, Model T-1718-A available from Otari Corp., of Canoga Park, Calif. The magnetic recording medium is positioned such that the magnetic coating will abrade against a corner of the ferrite bar. To this end, the ferrite bar is positioned to produce a penetration of 0.388 inches relative to the media path. The magnetic storage medium is directed across the ferrite bar at a speed of 39.4 inches per second at a tension of 5 ounces. The magnetic recording medium is run in a single direction across the ferrite bar, and a total of 1,700 feet of the magnetic recording medium is processed. The ferrite bar is then removed from the tape handling equipment, and a width of the abraded path on the ferrite bar is measured such as with an Olympus MX50 microscope. The width of the wear pattern is designated as the "Abrasivity Index".

Data Reliability Test—A reasonably demanding test was conducted as a benchmark for adequate assurance of reliability of the various examples and comparative examples. The test chosen for this purpose was a data reliability test in which a data cartridge containing the sample media was written and then read, and rewritten and reread continuously by a drive. While the drive is writing and reading data, the write and read error rates are recorded. The environment in which the drive system is operating during the test is cycled through a range of operating environments, which, according to ANSI and ECMA standards, includes a temperature range of 10-40° C., a relative humidity range of 20%-80%, and a dew point that does not exceed 25° C. The test monitored both write error rates given as correctable errors per megabyte and read error rates given as correctable errors per gigabyte over a 300-hour test period.

Example 1

A first, exemplary dual layer, DLT compatible magnetic recording medium in accordance with the present invention was prepared according to the following formulations:

A. Upper Layer

The upper layer formulation of Example 1 consisted of the components and amounts described above, including a primary metal particle, abrasive additive (or HCA), large particle carbon, surfactant, polyurethane binder, vinyl chloride binder, hardener, and lubricant. To this end, the HCA component, that otherwise has a direct effect on a resultant Abrasivity Index, was in the form of aluminum oxide from Sumitomo Chemical under the tradename HIT60A, in an amount of 8 parts by weight based upon 100 parts by weight of the primary metal particle.

B. Lower Layer

The lower layer formulation of Example 1 consisted of the components and amounts described above, including hematite, conductive carbon, HCA, surfactant, polyurethane binder, vinyl chloride binder, hardener and lubricants. To this end, the HCA component was in the form of aluminum oxide from Sumatomo Chemical under the tradename HIT60A in an amount of 5 parts by weight based upon 100 parts by weight of the hematite particle. Further, the lubricants consisted of stearic acid in an amount of 1.0 parts by weight based upon 100 parts by weight of the hematite particle and butyl stearate in an amount of 0.7 parts by weight based upon 100 parts by weight of the hematite particle.

C. Back Coat

The back coat formulation of Example 1 consisted of the components and amounts described above, including a primary non-magnetic particle, binder, surfactant; and abrasive additive (HCA). To this end, the HCA component was in the form of aluminum oxide in an amount of 0.6 parts by weight based upon 100 parts by weight of the primary non-magnetic particle.

D. Processing

The above-recited formulations were prepared and applied to a PET substrate pursuant to a wet-on-wet process. Following calendering at 145° F. with 2083 pounds per linear inch ("pli") and slitting processing, the so-formed front coat was subjected to a burnishing operation consisting of two lapping stations, the first of which employed a 0.5 micron silicon carbide film and the second having a 3.0 micron silicon carbide film. The resultant magnetic recording tape was formatted to be DLT compatible and was designated as "8143-208" (hereinafter referred to as "Example 1").

Example 2

A second, exemplary dual layer DLT compatible magnetic recording medium in accordance with the present invention was formed using upper layer and lower layer formulations and processing conditions virtually identical to those described above with respect to Example 1 was produced and designated as "8255" (hereinafter referred to as "Example 2"). The only differences were that with Example 2, the lower layer formulation included 2.5 parts by weight of stearic acid and 1.0 parts by weight of butyl stearate, based on 100 parts by weight of the hematite particle; the back coat formulation did not include an HCA component; and processing conditions included calendering at 180° F. with 1662 pli.

Example 3

A third, exemplary dual layer DLT compatible magnetic recording medium in accordance with the present invention was formed using the identical upper layer and lower layer formulations and processing conditions as described above in Example 2, and designated as "8279" (hereinafter referred to as "Example 3").

Comparative Example 1

A first, comparative dual layer DLT compatible magnetic recording medium was prepared utilizing the same upper and lower layer formulations as set forth above with respect to Example 1. Processing of the formed medium was also virtually identical to Example 1, except that different burnishing conditions were employed. More particularly, burnishing consisted of two lapping stations, each of which employed a 0.5 micron silicon carbide lapping film. The resultant medium was designated as "8143-108" (hereinafter referred to as "Comparative Example 1").

Comparative Example 2

Multiple samples of an available, DLT-accepted magnetic storage tape medium (as part of an off-the-shelf data storage tape cartridge) were obtained and tested as follows (hereinafter referred to as "Comparative Example 2").

Test Results

A. Abrasivity

The Abrasivity Index for each of the Examples and Comparative Examples was determined as set forth above. The results of the Abrasivity Index testing are provided in Table 1.

TABLE 1

| Media | Abrasivity Index (microniches) |
|---|---|
| Example 1 | 330 |
| Examples 2 and 3 (combined average) | 260 |

TABLE 1-continued

| Media | Abrasivity Index (microniches) |
|---|---|
| Comparative Example 1 | 1310 |
| Comparative Example 2 | 449 |

Figure 2A:
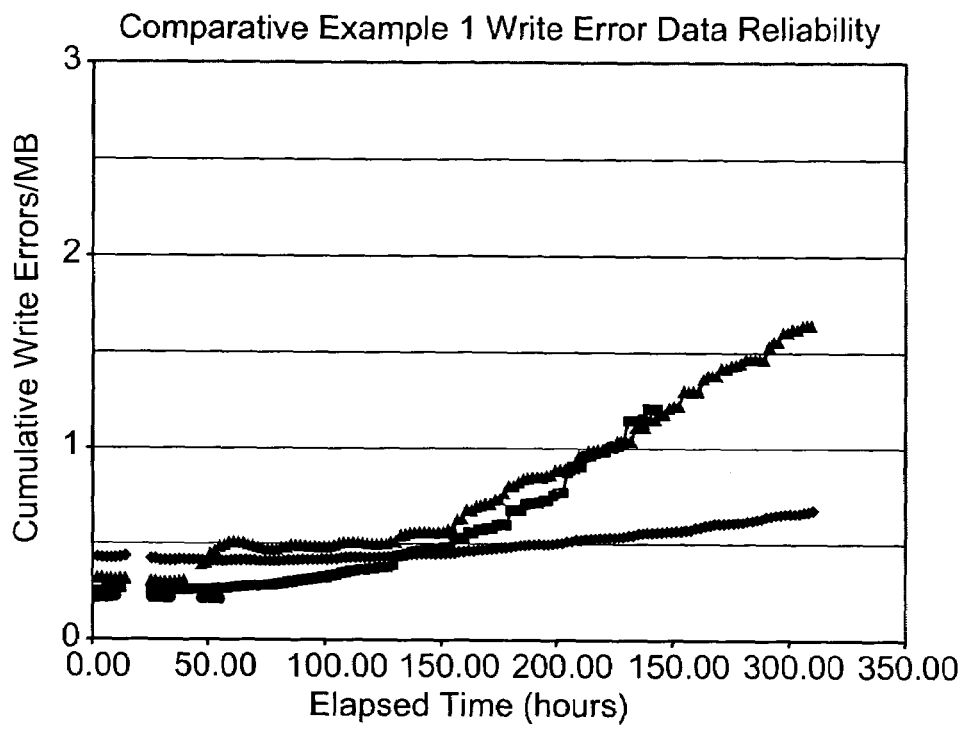
FIGS. 2A-9B are graphs illustrating performance reliability of the magnetic recording medium in accordance with the present invention as compared to more abrasive constructions.
Figure 2B:
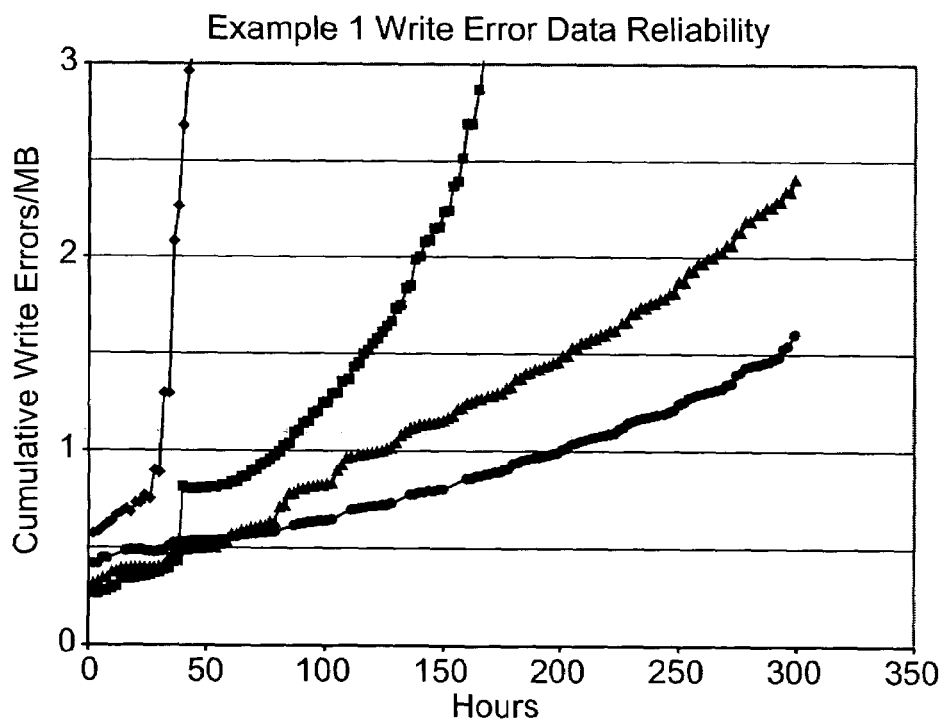
Figure 3A:
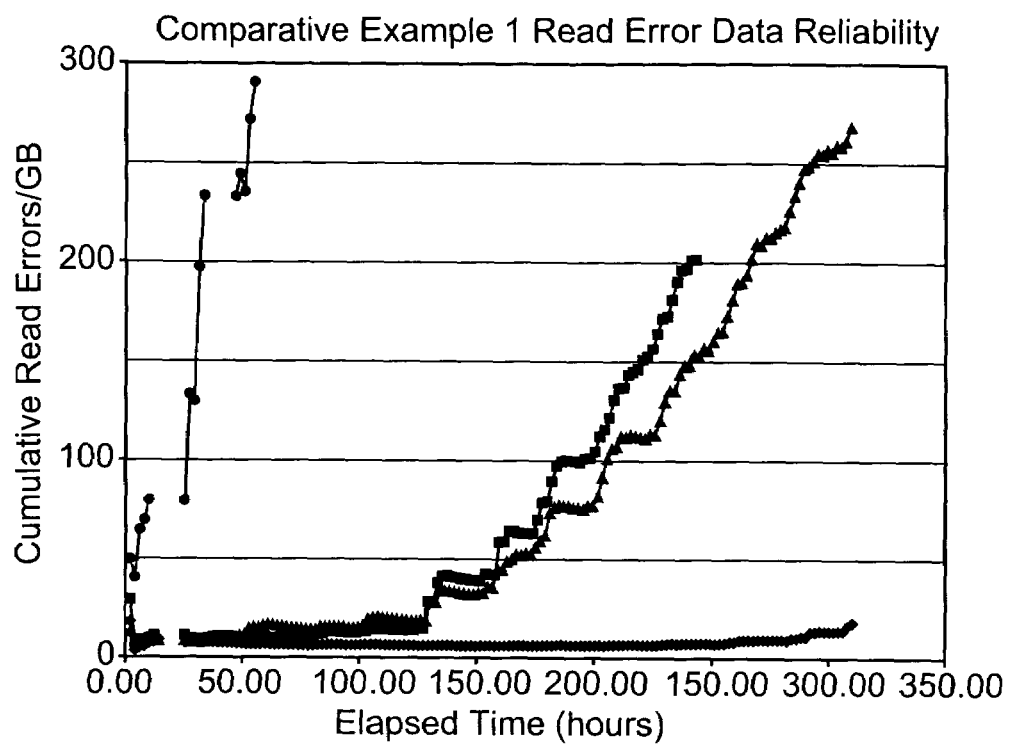
Figure 3B:
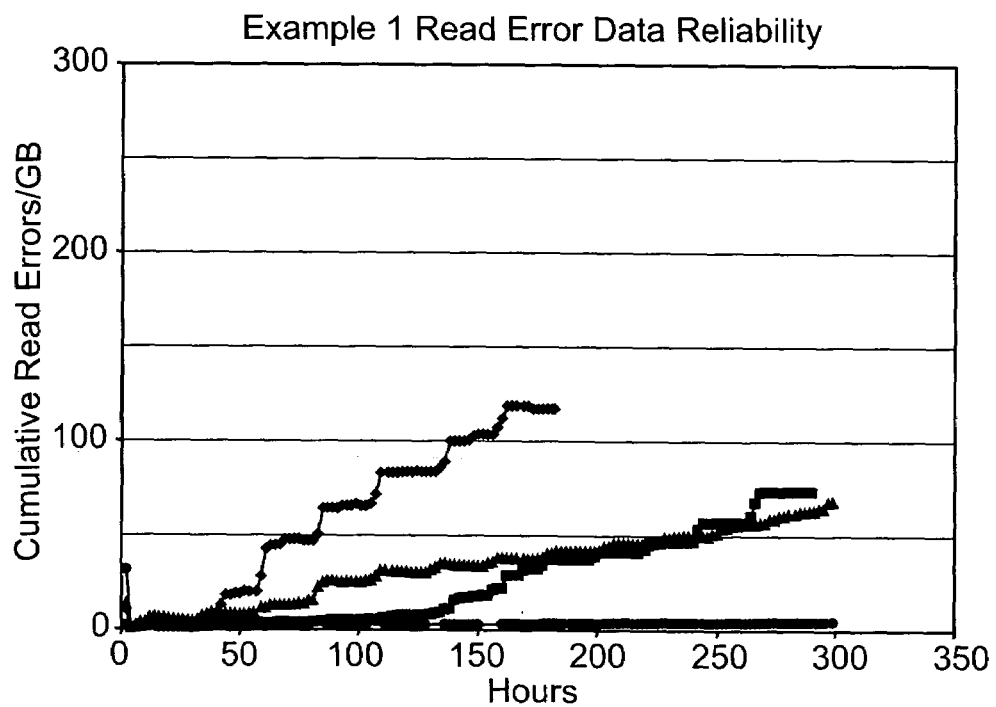

B. Data Reliability Comparison of Low Abrasivity Media and High Abrasivity Media Read and write error data reliability of the low abrasivity media of the (Comparative Example 1). In particular, four data storage tape cartridges were prepared using the media of Example 1 and four additional data storage tape cartridges were prepared using the media of Comparative Example 1. Each of the eight sample cartridges was then operated in accordance with the Data Reliability Test described above. Cumulative write errors for the four high abrasivity media sample cartridges (Comparative Example 1) are provided in FIG. 2A, whereas the write error Data Reliability Test results for the low abrasivity sample cartridges (Example 1) are provided in the plot of FIG. 2B. Similarly, the read error Data Reliability Test results for the high abrasivity media samples (Comparative Example 1) are provided in the plot of FIG. 3A, whereas the read error Data Reliability Test results for the low abrasivity samples (Example 1) are shown in FIG. 3B. A comparison of FIGS. 2A and 2B, as well as 3A and 3B at the point for which maximum test data exists in both data sets (130 hours), reveals no significant difference in either write or read error rates was found.

Figure 4A:
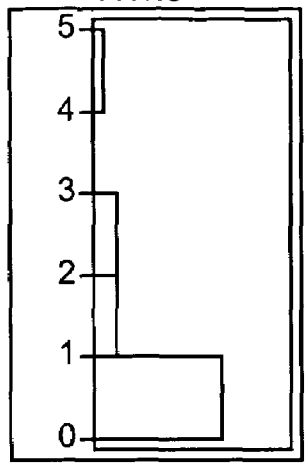
Figure 4B:
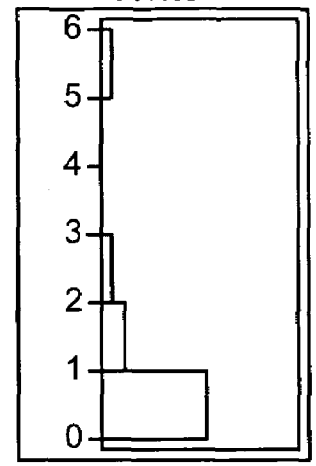
Figure 5A:
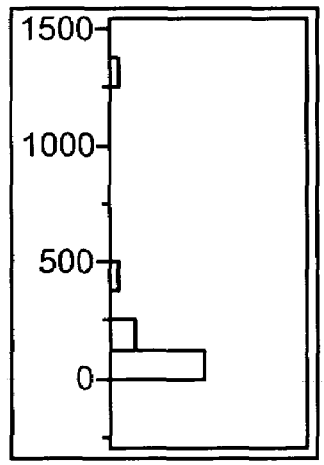
Figure 5B:
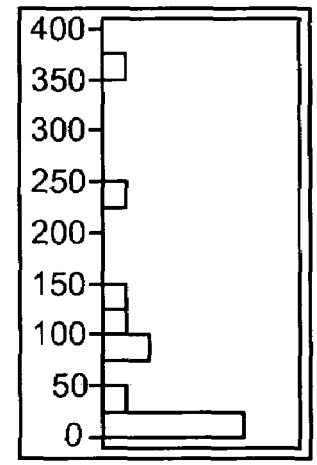

C. Data Reliability Comparison of Low Abrasivity DLT Media with Available DLT Media A comparison of the low abrasivity media of the present invention in a DLT format (Examples 2 and 3) was compared with DLT-accepted media (Comparative Example 2). In particular, sixteen data storage cartridges were prepared using the media of Examples 2 and 3 (hereinafter referred to as "Example 2, 3 test cartridges" and sixteen data storage tape cartridge having Comparative Example 2 media were obtained (hereinafter referred to as "Comparative Example 2 test cartridges"). The data storage tape test cartridges were cycled for 300 hours utilizing the Data Reliability Test parameters described above, and read and write errors tabulated. The write error rates for a combination of Example 2, 3 test cartridges is provided in FIG. 4A, whereas the distribution of error rates for Comparative Example 2 test cartridges is provided in FIG. 4B. Similarly, the distribution of read error rates for the combined Examples 2, 3 test cartridges is provided in FIG. 5A, whereas the distribution of read error rates for the Comparative Example 2 test cartridges is provided in FIG. 5B.

Figure 6A:
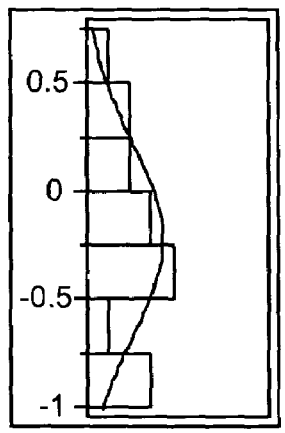
Figure 6B:
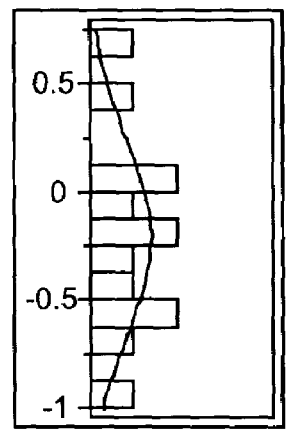
Figure 7A:
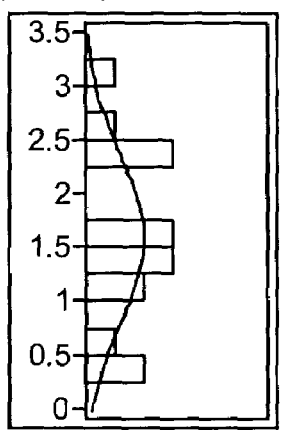
Figure 7B:
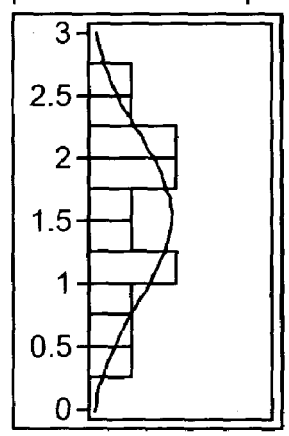
Figure 8A:
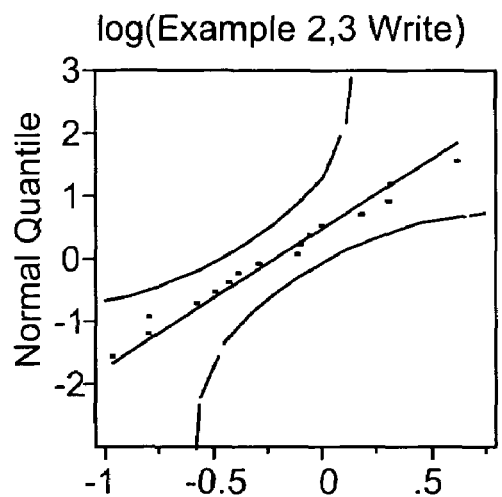
Figure 8B:
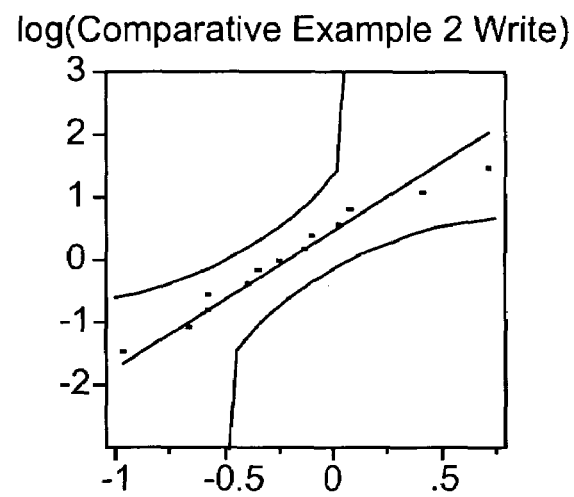
Figure 9A:
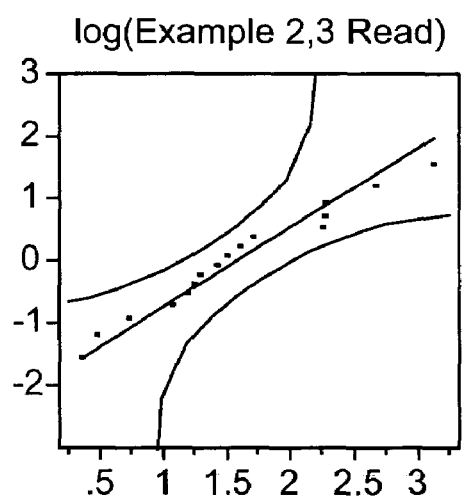
Figure 9B:
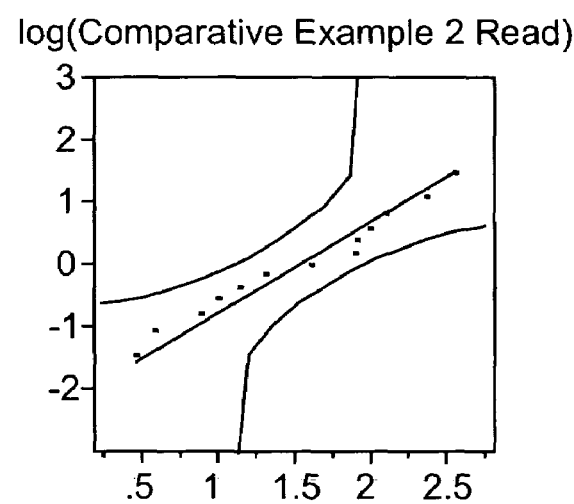

Logarithmic transformation was utilized to normalize the skewed error rate data to enable normal analysis of variability in all error rate distributions. In particular, FIGS. 6A and 6B plot a logarithmic transform to the distribution of write error rate data for the combined Example 2, 3 test cartridges (FIG. 5A) and the Comparative Example 2 test cartridges (FIG. 5B), respectively. Additionally, FIGS. 7A and 7B plot the logarithmic transform to the distribution of read error rate data for the combined Examples 2, 3 test cartridges and the Comparative Example 2 test cartridges. The quantile plots of FIGS. 8A and 8B illustrate uniformity of fit across the full data range for the write error rates for the combined Example 2, 3 test cartridges and the Comparative Example 2 test cartridges, respectively. Similarly, FIGS. 9A and 9B provide quantile plots showing uniformity of fit across the full data range for read error information for the combined Example 2, 3 test cartridges and the Comparative Example 2 cartridges, respectively. As set forth in Table 2 below, goodness-of-fits statistics (pursuant to the Shapiro-Wilk W Test) confirm low probabilities that the uniformity of fit conclusions described above are due to random chance.

TABLE 2

| Media-Type/Error-Type | W | Probability < W |
|---|---|---|
| log (Example 2, 3 Write) | 0.978627 | 0.9274 |
| log (Comparative Example 2 Write) | 0.977413 | 0.9316 |
| log (Example 2, 3 Read) | 0.966972 | 0.7576 |
| log (Comparative Example 2 Read) | 0.956239 | 0.6500 |

Using the logarithmic transformed data (that normalizes the distributions), the error distribution for the Comparative Example 2 test cartridges is provided in Table 3 below.

TABLE 3

Comparative Example 2 Error Distribution

| Statistical Parameter | Write Errors | Read Errors |
|---|---|---|
| Average (log errors) | −0.208 | 1.537 |
| Standard Deviation ("S. D.") (log errors) | 0.455 | 0.677 |

The error distribution for the Example 2, 3 test cartridges is provided in Table 4 below.

TABLE 4

Example 2, 3 Error Distribution Parameters

| Statistical Parameter | Write Errors | Read Errors |
|---|---|---|
| Average (log errors) | −0.217 | 1.589 |
| S. D. (log errors) | 0.449 | 0.779 |

In light of the above, and in particular a statistical comparison of Tables 3 and 4, the performance capability (in terms of likelihood of errors) of Example 2, 3 test cartridges is statistically equivalent with the performance capabilities of the Comparative Example 2 test cartridges.

Finally, any hard errors that occur during testing of the Example 2, 3 test cartridges and the Comparative Example 3 test cartridges was noted. No hard errors occurred during testing of the sixteen Example 2 and 3 sample cartridges, whereas four of the sixteen Comparative Example 2 sample cartridges (25%) experienced hard errors. A hard error was noted whenever a non-correctible error occurred.

Based on the above analysis, the Example 2, 3 test cartridges, and thus the media of Examples 2 and 3, performed equally as well as the Comparative Example 2 test cartridges, and thus the media of Comparative Example 2, in terms of data reliability.

Although the present invention has been described with reference to preferred embodiments, workers skilled in the art will recognize that changes can be made in form and detail without departing from the spirit and scope of the present invention.

What is claimed is:

1. A magnetic recording medium comprising:
a non-magnetic substrate defining a front side and a back side;
a magnetic coating formed over the front side and characterized by Abrasivity Index of not greater than 350 microinches; and
a non-magnetic back coating formed over the back side of the non-magnetic substrate, the back coating including a primary, small carbon black with an average particle size between 10 nm and 25 nm and a secondary, large carbon black with an average particle size between 50 nm and 300 nm.

2. The magnetic recording medium of claim 1, wherein the Abrasivity Index is in the range of 150-350 microinches.

3. The magnetic recording medium of claim 1, wherein the Abrasivity Index is not greater than 300 microinches.

4. The magnetic recording medium of claim 1, wherein the magnetic coating includes a lower layer formed on the front side of the substrate and the upper layer formed over the lower layer.

5. The magnetic recording medium of claim 4, wherein the upper layer includes a magnetic metal particle dispersed in a binder and otherwise provides the Abrasivity Index.

6. The magnetic recording medium of claim 5, wherein the magnetic metal particle is composed of at least 80% elemental iron having a coercivity in the range of 1600-2500 Oe as measured by VSM at 13 kOe.

7. The magnetic recording medium of claim 5, wherein the upper layer includes head cleaning agent in the range of 5.75-10.35 parts by weight based upon 100 part by weight of the magnetic metal particle.

8. The magnetic recording medium of claim 1, wherein the magnetic recording medium is a DLT tape.

9. The magnetic recording medium of claim 1, wherein the magnetic recording medium is configured to conform with an ECMA standard selected from the group consisting of DLT4, DLT5, and DLT6.

10. The magnetic recording medium of claim 1, wherein the magnetic coating has a coercivity of at least 1900 Oe.

11. The magnetic recording medium of claim 4, wherein the lower layer includes a bead cleaning agent.

12. The magnetic recording medium of claim 4, wherein the lower layer includes carbon black having an average particle size of less than 20 nm.

13. The magnetic recording medium of claim 12, wherein the lower layer includes carbon black in the range of 1 to 5 parts by weight based upon 100 parts by weight of a primary pigment included in the lower layer.

14. The magnetic recording medium of claim 1, wherein the back coating includes a head cleaning agent.

15. The magnetic recording medium of claim 1, wherein the magnetic coating is a burnished magnetic coating.

16. The magnetic recording medium of claim 15, wherein the burnished magnetic coating is at least one of a scraped magnetic coating, a vamed magnetic coating, and a lapped magnetic coating.

17. The magnetic recording medium of claim 1, wherein the magnetic recording medium exhibits a recording density of 55 kfci.

18. A magnetic recording medium comprising:
a non-magnetic substrate defining a front side and a back side;
a magnetic coating formed over the front side, the magnetic coating including a conductive carbon black material, having an avenge particle size of less than 20 nm, wherein the magnetic coating exhibits an Abrasivity Index in the range of 150-300 microinches; and
a non-magnetic back coating formed over the back side of the non-magnetic substrate, the back coating including a primary, small carbon black with an average particle size between 10 nm and 25 nm and a secondary, large carbon black with an average particle size between 50 nm and 300 nm.

19. The magnetic recording medium of claim 1, wherein the magnetic coating comprises a lower layer deposited on the front side of the non-magnetic substrate and an upper layer deposited on the lower layer, the upper layer selectively configured to reduce the Abrasivity Index of the magnetic coating to between about 150-350 microinches.

20. A magnetic recording medium comprising:
   a non-magnetic substrate defining a front side and a back side;
   a magnetic coating deposited and dried on the non-magnetic substrate, the magnetic coating including a lower layer deposited on the front side of the non-magnetic substrate and an upper layer deposited on the lower layer, at least one of the lower layer and the upper layer including particles providing the dried magnetic coating with an initial abrasivity of greater than 350 microinches; and
   a non-magnetic back coating formed over the back side of the non-magnetic substrate, the back coating including primary, small carbon black with an average particle size between 10 nm and 25 nm and a secondary, large carbon black with an average particle size between 50 nm and 300 nm;
   wherein the upper layer is configured to reduce the initial abrasivity of the dried magnetic coating such that the upper layer is characterized by Abrasivity Index of not greater than 350 microinches.

21. The magnetic recording medium of claim 20, wherein the particles comprise cobalt-containing iron oxide particles.

* * * * *